United States Patent [19]
Ciolli

[11] Patent Number: 5,573,472
[45] Date of Patent: Nov. 12, 1996

[54] WRAP SPRING DOWNSHIFT MECHANISM

[76] Inventor: Donald A. Ciolli, 2588 Eaton Rd., University Heights, Ohio 44118

[21] Appl. No.: 389,357

[22] Filed: Feb. 16, 1995

Related U.S. Application Data

[63] Continuation-in-part of Ser. No. 72,106, Jun. 7, 1993, Pat. No. 5,399,129.

[51] Int. Cl.$^6$ ............................. F16D 43/12; F16H 5/10
[52] U.S. Cl. ...................................... 475/301; 192/48.92
[58] Field of Search .................... 192/415, 81 C, 192/20, 48.3, 48.92, 55.5, 55.7, 56.2, 104 C; 475/270, 301

[56] References Cited

U.S. PATENT DOCUMENTS

| | | | |
|---|---|---|---|
| Re. 33,514 | 1/1991 | Ciolli | 192/48.92 |
| 2,229,654 | 1/1941 | Hubbell | 475/301 X |
| 2,437,517 | 3/1948 | Greenlee | 74/290 |
| 2,484,185 | 10/1949 | Pepper | 192/56 |
| 2,510,667 | 6/1950 | Starkey | 192/56 |
| 2,571,232 | 10/1951 | Gorske | 192/41 |
| 2,588,187 | 3/1952 | Weiser | 475/301 X |
| 2,951,568 | 9/1960 | Hungerford, Jr. et al. | 192/81 |
| 3,018,673 | 1/1962 | Hitt et al. | 475/301 |
| 4,255,987 | 3/1981 | Ciolli | 74/768 |
| 4,328,871 | 5/1982 | Gluskin | 173/12 |
| 4,364,286 | 12/1982 | Ciolli | 74/768 |
| 4,605,107 | 8/1986 | Hallidy et al. | 192/56.2 X |
| 4,674,612 | 6/1987 | Ogura | 192/104 CX |
| 4,691,786 | 9/1987 | Fujita et al. | 173/12 |
| 4,848,433 | 7/1989 | Bresson et al. | 475/301 X |
| 4,869,139 | 9/1989 | Gotman | 81/475 |
| 4,991,473 | 2/1991 | Gotman | 81/475 |
| 5,022,505 | 6/1991 | Io | 192/48.92 X |

FOREIGN PATENT DOCUMENTS

| | | | |
|---|---|---|---|
| 1110021 | 10/1956 | Germany | 475/301 |
| 50255 | 3/1984 | Japan | 475/301 |
| 991437 | 5/1965 | United Kingdom | 475/301 |

*Primary Examiner*—Khoi Q. Ta
*Attorney, Agent, or Firm*—Brinks Hofer Gilson & Lione

[57] ABSTRACT

A down shift mechanism for incorporation in a device such as an assembly tool includes a wrap spring which locks and releases a planetary gear speed reduction assembly to provide shifts between two drive ratios in response to torque throughput. The wrap spring is received upon a drive drum within a cylindrical housing. The ends of the wrap spring are engaged by a pair of relatively rotationally adjustable and fixable spring engaging lugs which adjust the preload of the wrap spring and thus the torque level at which the spring unwraps and lifts off the drive drum and at which the shift occurs. The wrap spring housing is coupled to the ring gear of the planetary gear assembly. When the torque applied to the wrap spring exceeds the preload, the spring unwraps, unlocking the ring gear and planetary gear assembly and downshifting to the speed reduction determined by the planetary gear assembly. An alternate embodiment of the downshift mechanism is also presented.

23 Claims, 4 Drawing Sheets

WRAP SPRING DOWNSHIFT MECHANISM

CROSS REFERENCE TO CO-PENDING APPLICATION

This patent application is a continuation-in-part application of Ser. No. 08/072,106 filed Jun. 7, 1993, now U.S. Pat. No. 5,399,129, granted Mar. 21, 1995.

BACKGROUND OF THE INVENTION

The invention relates to an automatic downshift power transmission device which automatically shifts between direct drive and reduced speed drive in response to the level of torque transmitted through the mechanism and more specifically to an automatic downshift mechanism incorporating a wrap spring, planetary gear speed reduction assembly and overrunning clutch.

The majority of power delivery devices include means for matching the speed and torque of the prime mover to the load. This results from the almost universal practice of utilizing a mechanical energy source such as an electric, pneumatic or hydraulic motor or internal combustion engine which delivers optimum power and torque over a relatively narrowly defined speed range. Thus, it is common practice to couple the output of such a device to a mechanism such as a gear box which multiplies torque and reduces speed to match the output of the prime mover to the mechanical task assigned to it. The power delivery device can be, and often is, further refined by adding a device having two or more gear ratios which are sequenced to closely match the torque and speed source/load variables in real time. The power train of an automobile comprising an internal combustion engine and an automatic or manual transmission represents a foremost example of this configuration.

The issue of speed and torque matching has also been addressed in connection with drive units for assembly tools. In this application, a fastener such as a nut, bolt, machine screw, self-threading screw or any threaded component will generally require low torque application as it is initially rotated prior to engaging the component or components which it will secure. When the fastener does engage such components, the torque required to rotate it will typically increase. The increased level of torque application is frequently monitored such that the torque ultimately applied to the fastener is appropriate to the application and consistent with the maximum torque the fastener may withstand without thread stripping or other damage, either to itself or the assembled components.

A common conundrum of such devices relates to the need for relatively high speed, low torque power application during rundown of the fastener and higher, though carefully controlled, torque application near the end of the cycle to fully tighten the fastener to a desired torque specification.

I have expended great effort to develop torque control devices which not only limit torque application to a preselected level but also have reversible outputs or two speed outputs. For example, my U.S. Pat. No. 4,255,987, which issued Mar. 17, 1981, teaches a compact reversible speed reduction mechanism ideally suited for incorporation into assembly tools. The device includes a pair of juxtaposed epicyclic gear trains mounted in a common carrier which independently engage a pair of ring gears to provide bi-directional output rotation.

A device providing a similar function is disclosed in my U.S. Pat. No. 4,364,286 which issued Dec. 21, 1982. Here, a pair of epicyclic gear trains mounted in a common carrier engage respective ring gears which are locked or released by a respective pair of wrap springs disposed about the cages.

My U.S. Reissue Pat. No. Re. 33,514 teaches a torque limiting assembly having a pair of coaxially disposed wrap springs; the first spring providing an adjustable torque transmission limit and the second providing a mechanical signal that the torque limit has been reached.

Others have addressed this area of technology as well. For example, U.S. Pat. No. 4,328,871 to Gluskin granted May 11, 1982 teaches an assembly which provides both a high speed/low torque mode for running down a threaded fastener and a low speed/high torque mode for tightening the fastener. The device utilizes two wrap springs: an inner wrap spring which locks and unlocks a planetary gear assembly and an outer wrap spring which is controlled by an actuator to control the gripping or release of the first wrap spring.

U.S. Pat. Nos. 4,869,139 and 4,991,473 of Gotman, the former which issued Sep. 26, 1989 and the latter which issued Feb. 12, 1991, both disclose an automatic speed and torque switching or shifting device. In this device, two different drive trains having distinct torque and speed outputs are driven in parallel by a common motor. Initially, the high speed, low torque output is utilized to drive the fastener. When the level of torque applied to the fastener increases, the coupling to the high speed drive train is disabled and the low speed, high torque output is utilized.

The foregoing discussion suggests not only the desirability of such dual speed/dual torque drive mechanisms which automatically select the appropriate drive speed and torque level output but also reveals the fact that such devices tend to be complicated and may require torque level sensors and auxiliary components to achieve their stated goals. Accordingly, it is apparent that improvements in the art of dual speed and torque delivering mechanisms which automatically shift between such outputs are desirable.

SUMMARY OF THE INVENTION

A wrap spring downshift mechanism for incorporation in a device such as an assembly tool includes a wrap spring which locks and releases a planetary gear speed reduction assembly to provide shifts between two drive ratios in response to torque throughput. An overrunning clutch allows the mechanism to be backdriven by the residual torque resulting from the torque transmission and structural deflection occurring during the operating cycle. The wrap spring is received upon a drive drum within a cylindrical housing. The drive drum receives and is driven by an input shaft through the overrunning or one-way clutch assembly. The ends of the wrap spring are engaged by a pair of relatively angularly adjustable and fixable spring engaging lugs which adjust the preload of the wrap spring and thus the torque level at which the spring lifts off the drive drum and the shift occurs. The wrap spring housing is coupled to the ring gear of the planetary gear assembly. When the torque applied to the wrap spring exceeds the preload, the spring lifts off the drive drum, unlocking the ring gear and planetary gear assembly and downshifting to the speed reduction determined by the planetary gear assembly. At the completion of the operating cycle, the motor is deactivated, the wrap spring re-engages the drum and the overrunning clutch unlocks the planetary gear speed reduction assembly when it is backdriven to allow sufficient rotation thereof to relieve reaction torque developed during the operating cycle. Preferred and alternate embodiments of the downshift mechanism are presented. The mechanism of the present invention provides highly accurate and repeatable shifts over an extended service life.

Thus it is an object of the present invention to provide a downshift mechanism which automatically selects between a first direct drive operating mode and a reduced speed, increased torque operating mode.

It is a further object of the present invention to provide an downshift mechanism having means for relieving the reaction drive torque at the end of an operating cycle.

It is a further object of the present invention to provide an downshift mechanism suitable for use in assembly tools.

It is a still further object of the present invention to provide an downshift mechanism wherein the torque application threshold resulting in a downshift is adjustable.

It is a still further object of the present invention to provide an downshift mechanism which utilizes a single wrap spring and at least one planetary gear assembly.

It is a still further object of the present invention to provide an downshift mechanism having both high repeatability and extended service life.

It is a still further object of the present invention to provide an downshift mechanism which is readily adapted to a broad range of assembly tools and other applications utilizing or requiring an automatic downshift power transmission mechanism.

Still further objects and advantages of the present invention will become apparent by reference to the following descriptions of the preferred and alternate embodiments and appended drawings.

DESCRIPTION OF THE PREFERRED AND ALTERNATE EMBODIMENTS

Figure 1:
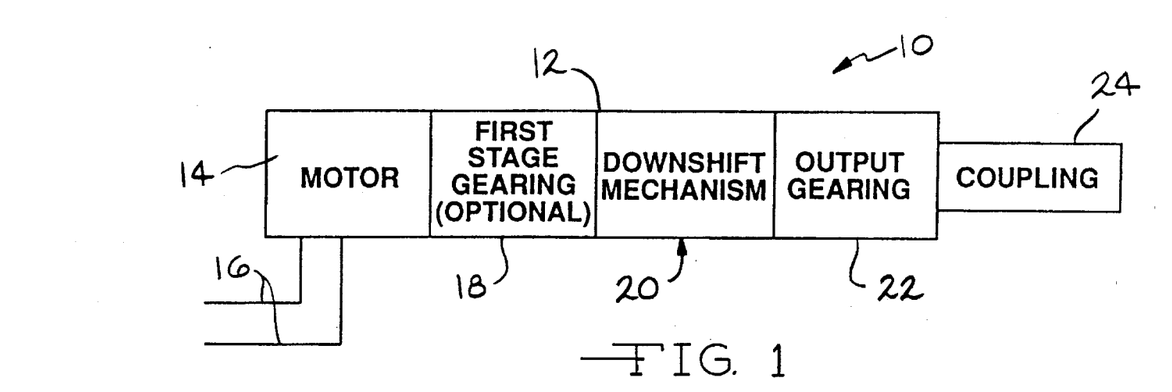
FIG. 1 is a schematic view of a power assembly tool incorporating an automatic downshift mechanism of the present invention.

Referring now to FIG. 1, an assembly tool which incorporates the present invention and which is exemplary and illustrative of a broad class of assembly tools is illustrated and generally designated by the reference numeral 10. The assembly tool 10 includes a housing 12 containing a prime mover such as an electrically, pneumatically or hydraulically powered motor 14 which is supplied with energy through a line 16. The rotating mechanical output of the motor 14 may be provided to a first stage, fixed ratio speed reduction gearing 18 which, as noted in FIG. 1, is optional. If the first stage gearing 18 is utilized in the assembly tool 10, its output is provided to a wrap spring downshift mechanism 20 according to the present invention. If the first stage gearing 18 is not present in the assembly tool 10, the rotating mechanical output of the motor 14 is provided directly to the downshift mechanism 20.

In turn, the mechanical output of the downshift mechanism 20 is provided to a final stage of fixed ratio speed reduction gearing 22 which rotatably drives an output coupling 24 which may be a screw driver blade, a hexagonal drive such as an Allen wrench, a socket or any other coupling designed to engage a complementarily configured fastener (not illustrated).

Figure 2:
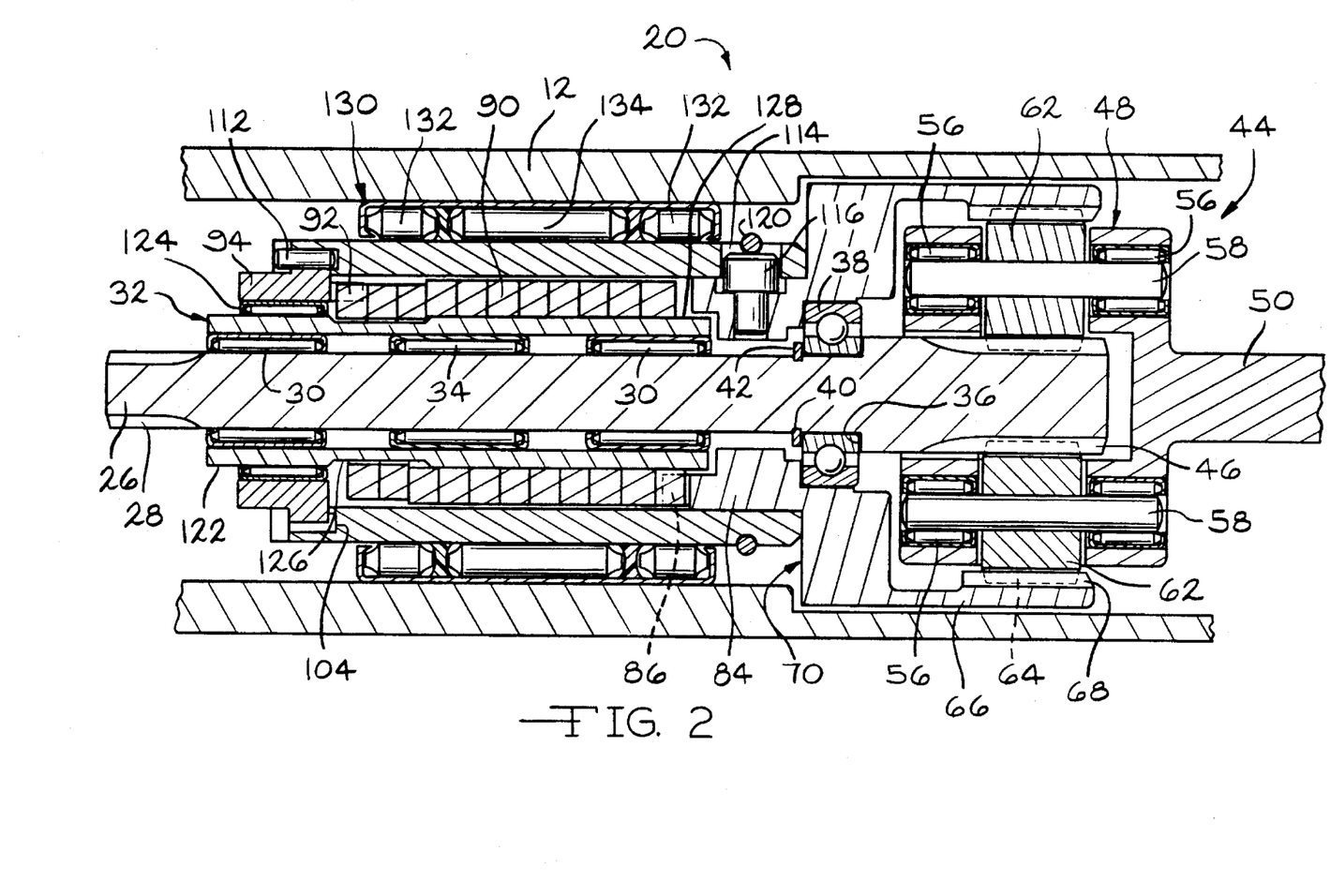
FIG. 2 is a full, sectional view of the preferred embodiment of an automatic downshift mechanism according to the present invention.
Figure 3:
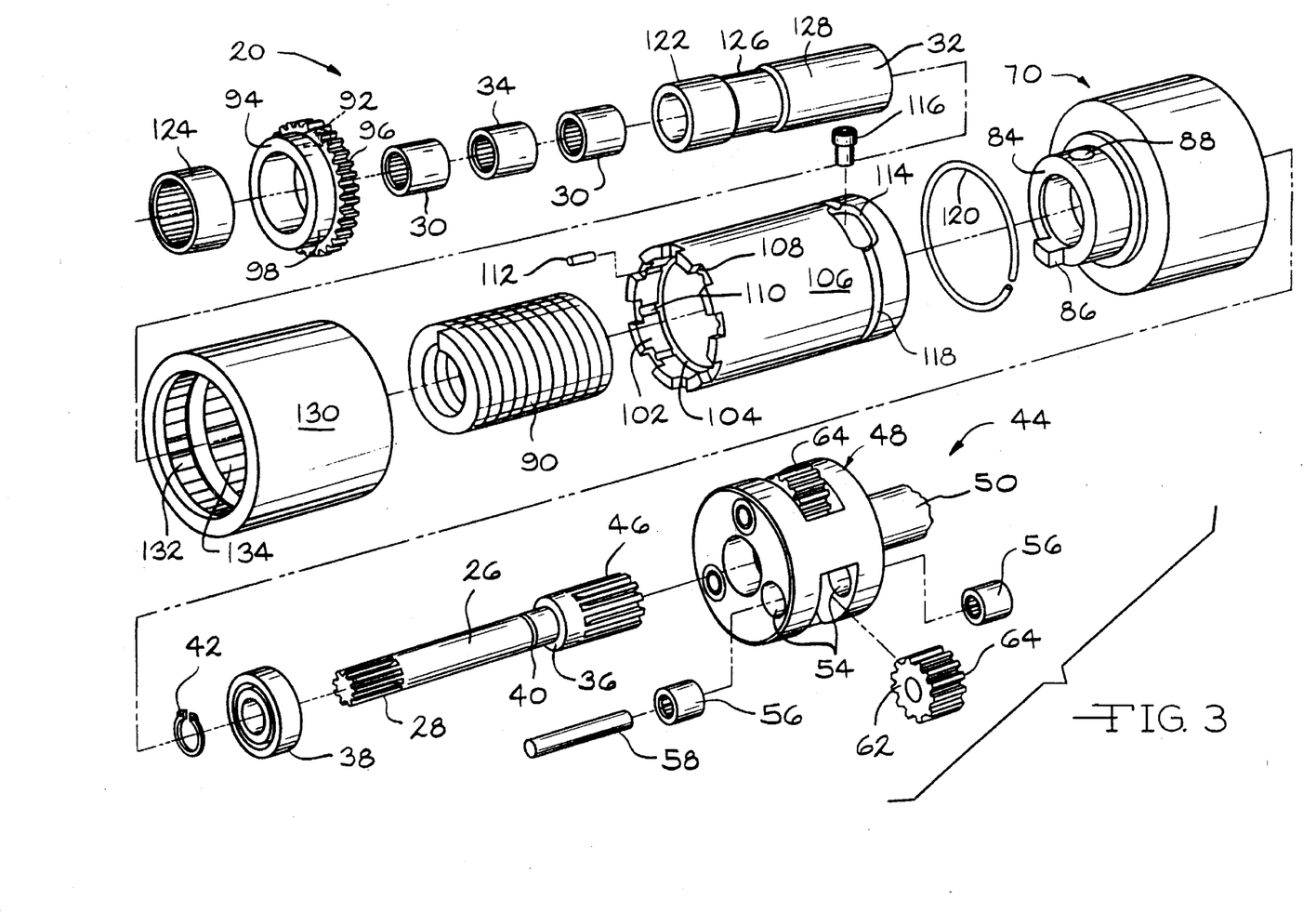
FIG. 3 is an exploded, perspective view of the preferred embodiment of an automatic downshift mechanism according to the present invention.

Referring now to FIGS. 2 and 3, the wrap spring downshift mechanism 20 according to the present invention is disposed in the housing 12 and includes an input shaft 26 having male splines 28 disposed adjacent a first terminus adjacent the first stage gearing 18, if utilized, or the motor 14, if no first stage gearing 18 is present. The male splines 28 engage and are received within complementarily configured female splines (not illustrated) disposed in an output member of the first stage gearing 18 or the motor 14. The input shaft 26 is driven by either the first stage gearing 18 or the motor 14, as noted above. The input shaft 26 extends axially along substantially the entire length of the downshift mechanism 20. Located generally about that portion of the input shaft 26 more proximate the male splines 28 are a pair of anti-friction needle bearing assemblies 30. The needle bearing assemblies 30 freely, rotatably support a concentrically disposed spring drive drum 32.

Intermediate the pair of needle bearing assemblies 30 and mechanically coupled to the input shaft 26 and the spring drive drum 32 is a first one-way, sprag or overrunning clutch assembly 34. The first overrunning clutch assembly 34 locks and thus transmits rotational energy to the spring drive drum 32 when the input shaft 26 rotates clockwise relative to the spring drive drum 32 when viewed from the input (left) end in FIG. 2. The first overrunning clutch 34 also locks and transfers energy when the spring drive drum 32 rotates counterclockwise relative to the input shaft 26. When the input shaft 26 rotates counterclockwise relative to the spring drive drum 32 the first overrunning clutch 34 releases and the input shaft 26 free wheels relative thereto. Likewise, the first overrunning clutch 34 also releases when the spring drive drum 32 rotates clockwise relative to the input shaft 26.

Disposed generally proximate the terminus of the input shaft 26 opposite the male splines 28 is a shoulder 36. The shoulder 36 functions as a stop and limits axial translation of an anti-friction bearing such as a ball bearing assembly 38. A circumferential groove 40 formed in the input shaft 26 receives and locates a snap ring 42 which snugly retains the ball bearing assembly 38 against the shoulder 36 and inhibits axial movement of the ball bearing assembly 38 away therefrom.

Disposed about the terminal portion of the input shaft 26 opposite the male splines 28 is a planetary gear assembly 44. The planetary gear assembly 44 includes a plurality of gear teeth 46 disposed on the input shaft 26 which comprise the sun gear of the planetary gear assembly 44. The planetary gear assembly 44 also includes a carrier assembly 48 and a stub shaft 50. The carrier assembly 48 and specifically the stub shaft 50 function as the output member of the downshift mechanism 20 and may include splines or other features (not illustrated) which couple the rotating output of the downshift mechanism 20 to the input of the output gearing 22 illustrated in FIG. 1.

A plurality of aligned pairs of passageways 54 within the carrier assembly 48 receive a plurality of roller bearing assemblies 56 which rotatably support a plurality of stub shafts 58. The pairs of passageways 54 and the roller bearing assemblies 56 are preferably disposed at equal 120° intervals about the axis of the carrier assembly 48. Generally centrally disposed upon the plurality of stub shafts 58 are an equal number of planet gears 62. The planet gears 62 include peripheral gear teeth 64 which are complementary to and engage the sun gear teeth 46 on the input shaft 26. A ring gear 66 having gear teeth 68 complementary to the gear teeth 64 on the planet gears 62 is aligned with, surrounds and is in constant mesh with the plurality of planet gears 62.

The ring gear 66 forms a portion of a ring assembly 70 which is disposed coaxially and concentrically about the input shaft 26. The ball bearing assembly 38 rotatably supports and axially positions the ring assembly 70 on the input shaft 26. The ring assembly 70 includes a reduced diameter neck region 84 having an axially extending spring engaging ear or lug 86 and a radially disposed aperture 88.

Concentrically disposed about the spring drive drum 32 is a wrap spring 90. The wrap spring 90 is of right-hand sense and preferably comprehends ten and one-half turns of conventional square wrap spring wire. One end of the wrap spring 90 is engaged by the spring engaging ear or lug 86 extending from the reduced diameter neck region 84 of the ring assembly 70. The other end of the wrap spring 90 is engaged by a complementarily disposed spring engaging ear or lug 92 extending from a gear collar 94. The gear collar 94 includes a plurality, preferably thirty-three, gear teeth 96 disposed about a portion of its periphery. An axially adjacent portion of the collar 94 defines a reduced diameter region 98. The periphery of the gear collar 94, that is, its outside diameter defined by the gear teeth 96, is a sliding fit within an enlarged diameter region 102 having a shoulder 104 formed in one end of a cylindrical spring drum 106.

The end of the cylindrical spring drum 106 having the enlarged diameter region 102 and shoulder 104 is castellated and includes a plurality of, preferably eight, notches 108. Centrally circumferentially disposed within each of the notches 108 is a respective one of a like number of semi-circular, equally spaced apart, axially aligned channels 110. The semi-circular channels 110 cooperate with the bights between the gear teeth 96 of the gear collar 94 to receive a single axially disposed register pin 112. Given the use of a gear collar 94 with thirty-three teeth and a spring drum 106 with eight semi-circular channels 110, insertion of the register pin 112 into one of the semi-circular channels 110 and alignment therewith with one of the bights between the gear teeth 96 permits selection and fixing of two hundred sixty-four unique positions of relative rotation, i.e., angular definition of 1.36°, between the gear collar 94 and the cylindrical spring drum 106.

At the end of the cylindrical spring drum 106 opposite the notches 108 is an elongate slot 114. The elongate slot 114 receives the head of a radially oriented stop pin 116. The body of the stop pin 116 is received within the complementarily sized aperture 88 in the reduced diameter neck region 84 of the ring assembly 70. Circumferentially aligned with the elongate slot 114 in the cylindrical spring drum 106 is a circumferential groove 118 which receives a complementarily sized snap ring 120. The snap ring 120 retains the stop pin 116 in the ring assembly 70, thus retaining the cylindrical spring drum 106 on the ring assembly 70 and permitting limited relative rotation therebetween.

The gear collar 94 is supported for rotation upon a first, larger diameter terminal portion 122 of the spring drive drum 32 by an anti-friction bearing such as a needle bearing assembly 124 which, in turn, supports the cylindrical spring drum 106. The spring drive drum 32 also includes an intermediate portion 126 of a reduced diameter and a second, larger diameter portion 128 of a diameter equal to the diameter of the first portion 122 which occupies approximately one-half the length of the spring drive drum 32. The diameter of the intermediate portion 126 of the spring drive drum 32 is preferably at least slightly smaller than the inside diameter of the wrap spring 90 in a relaxed state and the diameter of the second, larger diameter portion 128 of the spring drive drum 32 is greater than the inside diameter of the wrap spring 90 in a relaxed state. The difference in diameters and thus the extent to which the wrap spring 90 must be enlarged (unwound) to fit upon the second portion 128 of the spring drive drum 32, i.e., the magnitude of the interference fit, initially determines the torque preloaded into the wrap spring 90. This torque is equal to the torque level which must be applied to unwind the wrap spring 90, causing it to slip upon the spring drive drum 32. Applied torque levels below this preload will result in no slippage and thus complete torque transfer; greater applied torque levels will lift the wrap spring 90 off the spring drive drum 32 and completely inhibit torque transfer.

The cylindrical spring drum 106 has an inside diameter slightly larger than the outside diameter of the wrap spring 90 when it is disposed upon the larger first and second portions 122 and 128 of the spring drive drum 32. Positioned concentrically about the exterior surface of the cylindrical spring drum 106 is a clutch and bearing assembly 130. The clutch and bearing assembly 130 includes a pair of outboard roller bearings 132 flanking a centrally disposed second one-way, sprag or overrunning clutch assembly 134. The second overrunning clutch assembly 134 permits rotation of the cylindrical spring drum 106 in a clockwise direction as viewed from the left in FIG. 2 but resists motion and locks the cylindrical spring drum 106 to the housing 12 to prevent rotation thereof in a counterclockwise direction.

To utilize the wrap spring downshift mechanism 20 of the present invention, it is necessary to select and adjust the mechanism 20 to shift at a desired level of torque throughput. It should be appreciated that a spring such as the wrap spring 90 will transmit torque from a drive member such as the spring drive drum 32 in a direction which tends to unwind the wrap spring 90 only until transmitted torque is equal to the preload torque induced in the spring 90 by its interference fit with the spring drive drum 32. Since the preload of the wrap spring 90 due to the interference fit with the spring drive drum 32 is determined solely by the magnitude of such inference and is thus fixed for a given wrap spring/drum combination, in order to achieve adjustability of the maximum torque throughput and thus the point at which downshift occurs, it is necessary to include turns of the wrap spring 90 which may be adjustably preloaded. These turns are the approximately two and one-half turns of the ten and one-half turn wrap spring 90 which are received over the intermediate portion 126 of the spring drive drum 32.

As noted, the ends of the wrap spring 90 may be rotated relative to one another by adjustment of the gear collar 94 within the cylindrical spring drum 106 and the register pin 112 inserted in the bight between two adjacent gear teeth 96 into an aligned semi-circular channel 110. As also noted previously, the combination of eight possible locations of the register pin 112 with the thirty-three gear teeth 96 on the ring collar provides two hundred sixty-four unique relative positions of the ends of the wrap spring 90 per 360°. This preselected preload of the portion of the wrap spring 90 adjacent the intermediate portion 126 of the spring drive drum 32 subtracts from the preload in the remainder of the wrap spring 90 induced by the interference fit with the second, larger diameter portion 128 of the spring drive drum 32. Typically, the preload torque of the wrap spring 90 is adjusted to a level suitably lower than the stall torque of the drive motor 14 such that the wrap spring 90 will slip on the spring drive drum 32 and a downshift will occur before the drive motor 14 stalls.

Operation of the wrap spring downshift mechanism 20 occurs as follows. Normal rotation of the input shaft 26 is clockwise as viewed from the left end of such shaft in either FIG. 2 or FIG. 3. Torque is thus applied through the overrunning clutch assembly 34 and the spring drive drum 32 to the wrap spring 90 in a direction which tends to unwind it. Initially and at low torque levels, the wrap spring 90 couples the input shaft 26 and the sun gear teeth 46 to the ring assembly 70, thereby locking the planetary gear assembly 44. It will be appreciated that a portion of the torque passing through the downshift mechanism 20 is applied directly to the sun gear teeth 46 while the remainder is transmitted through the wrap spring 90.

As the torque level passing through the wrap spring downshift mechanism 20 increases to the level at which it is equal to the interference preload of the wrap spring 90 less the preselected preload, the wrap spring 90 will begin to slip and the planetary gear assembly 44 will begin to downshift. With the slightest further increase in transmitted torque, the wrap spring 90 will lift completely off the spring drive drum 32 thereby fully unlocking the input shaft 26 and the sun gear teeth 46 from the ring assembly 70. The wrap spring downshift mechanism 20 then provides a reduced speed, increased torque output at the stub shaft 50 determined by the gear ratio of the planetary gear assembly 44.

Reaction torque at such transition torque levels is transmitted counterclockwise from the ring assembly 70 through the wrap spring 90 by means of the lugs 86 and 92 to the spring drum 106. As this reaction torque increases, the diameter of the wrap spring 90 will continue to expand until it contacts the inside surface of the spring drum 106. The wrap spring 90 then locks to the spring drum 106, allowing significant further torque increases to be reacted against the second overrunning clutch assembly 134. The stop pin 116 cooperates with the elongate slot 114 and functions as a safety stop to limit relative rotation between the spring drum 106 and the ring assembly 70 and thus relative rotation between the ends of the wrap spring 90 in one direction. In the opposite direction of relative rotation, such cooperation limits travel and acts as a stop against which the preselected preload of the wrap spring 90 is reacted.

When the fastening cycle is complete or when the torque throughput drops below the level necessary to maintain the wrap spring 90 out of contact with the spring drive drum 32, the wrap spring 90 once again engages the surface of the spring drive drum 32 and locks the elements of the planetary gear assembly 44 together, thereby returning to a direct drive state. Without the first overrunning clutch assembly 34, the locking together of the elements of the planetary gear assembly 44 will store residual reaction torque resulting from the torque transmission and structural deflection of the downshift mechanism 20 during its operating cycle. The first overrunning clutch assembly 34, however, allows the input shaft 26 to rotate counterclockwise relative to the spring drive drum 32 thereby releasing the stored reaction torque in the wrap spring downshift mechanism 20. This release of the residual reaction torque is achieved by allowing these components to be back driven by such torque to the extent necessary to relieve it.

Figure 4:
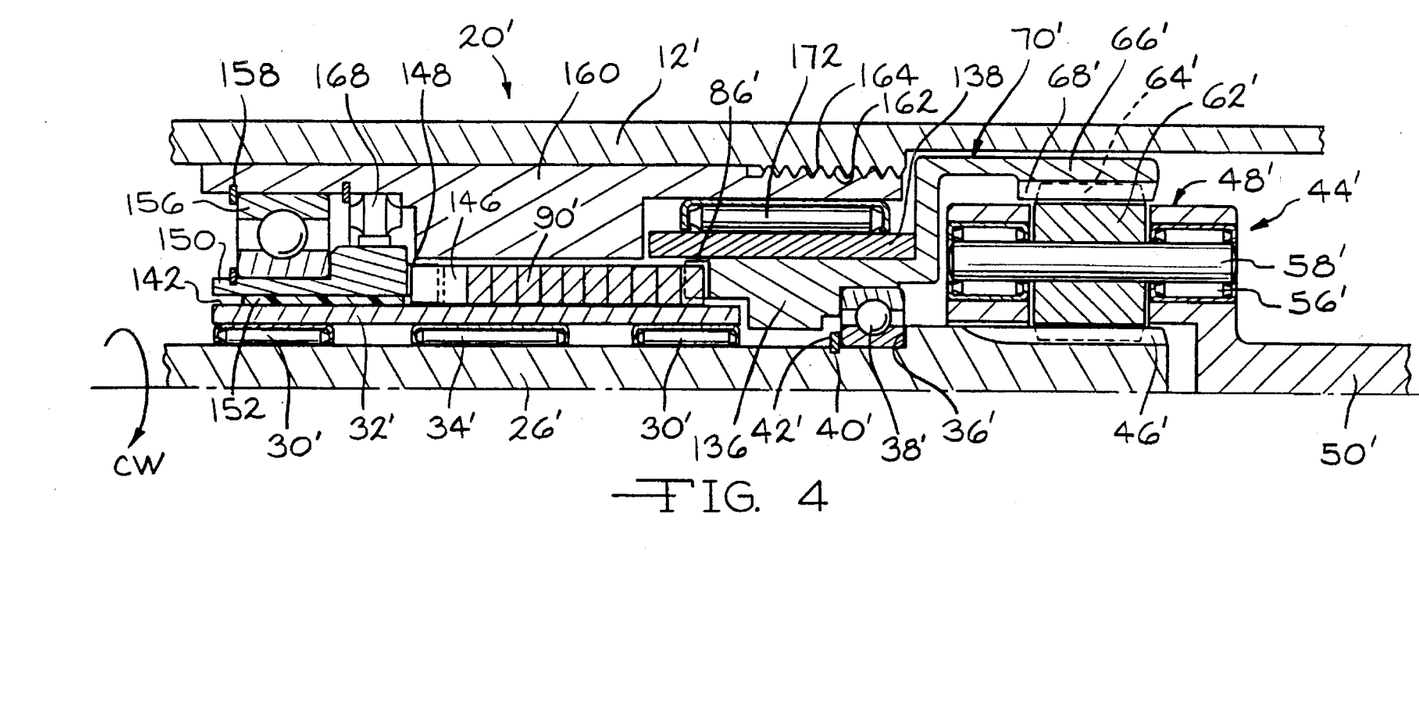
FIG. 4 is a half, sectional view of an alternate embodiment of an automatic downshift mechanism according to the present invention.

Referring now to FIG. 4, a first alternate embodiment of an automatic downshift mechanism 20' is illustrated. The alternate embodiment automatic downshift mechanism 20' includes certain components of the preferred embodiment downshift mechanism 20 generally relating to the input, wrap spring drive and planetary gear mechanism but further includes additional and variant components different from the preferred embodiment downshift mechanism 20. Thus, the alternate embodiment downshift mechanism 20' includes an input shaft 26' which receives and supports a pair of spaced apart roller bearings 30' which, in turn freely, rotatably support a spring drive drum 32'. The spring drive drum 32' defines a uniform (constant) diameter outer surface 142 along its length. Positioned axially intermediate the pair of roller bearings 30' is a first one-way or overrunning clutch assembly 34'. The input shaft 26' also includes a shoulder 36'. The shoulder 36' functions as a stop to limit axial movement of a ball bearing assembly 38'. A circumferential groove 40' formed in the input shaft 26' receives and locates a snap ring 42' which snugly retains the ball bearing assembly 38' against the shoulder 36' and inhibits axial movement of the ball bearing assembly 38' away therefrom.

A planetary gear assembly 44' includes a sun gear comprising gear teeth 46' on the input shaft 26' and a carrier 48' having an integrally formed output shaft 50'. The carrier 48 receives a plurality of anti-friction bearings such as the roller bearing assemblies 56' which support a plurality of stub shafts 58'. The stub shafts 58', in turn rotatably support a like plurality of planet gears 62' having gear teeth 64'. The gear teeth 64' engage a ring gear 66' having complementarily configured gear teeth 68' on its inner surface.

The ring gear 66' forms a portion of a ring gear hub 70' which is rotatably supported by the ball bearing assembly 38' upon the input shaft 26'. Affixed to a reduced diameter region 136 of the ring gear hub 70' by an interference fit or other suitable positive securement means is a spring sleeve 138 which defines an overhanging lip or inner surface adjacent one end of the wrap spring 90'. The ring gear hub 70' includes an ear or lug 86' which engages one end of a wrap spring 90'. The wrap spring 90' is concentrically disposed about the spring drive drum 32' and comprehends preferably about nine to twelve turns of right hand wound square spring wire. The end of the wrap spring 90' adjacent the ear or lug 86' is cut off square. The opposite end of the wrap spring 90 includes a bent or formed axially extending tang 146 which is received within a complementarily sized slot 148 in a spring lock ring 150. As noted above with regard to the preferred embodiment mechanism 20, the magnitude of the interference fit between the inside surface of the wrap spring 90' and the spring drive drum 32' determines the torque preload residing in the wrap spring 90' and thus the torque level necessary to cause the wrap spring 90' to unwind and commence slipping on the spring drive drum 32'. In this alternate embodiment mechanism 20', no other adjustment feature is utilized.

The spring lock ring 150 is spaced from the spring drive drum 32' by a sleeve bearing 152. The spring lock ring 150 is, in turn, positioned and rotatably supported by an anti-friction assembly such as a ball bearing assembly 156. The ball bearing assembly 156 may be retained by a suitable snap ring 158 in a reaction sleeve 160. The reaction sleeve 160 is a preferably relatively close fit within the housing 12 and may be retained therein by suitable complementary male threads 162 on the reaction sleeve 160 and female threads 164 in the housing 12'. The inner diameter of the reaction sleeve 160 is preferably equal to the inner diameter of the spring sleeve 138. Arranged in mechanical parallel with the ball bearing assembly 156 between the spring lock ring 150 and the reaction sleeve 160 is a sprag type, one-way or overrunning clutch assembly 168. At the opposite end of the reaction sleeve 160, a roller bearing assembly 172 is disposed and freely rotatably supports the spring sleeve 138 and the ring gear hub 70'.

Operation of the first alternate embodiment of the wrap spring downshift mechanism 20' is similar to that of the preferred embodiment wrap spring downshift mechanism 20. Input drive torque is delivered to the input shaft 26' in a clockwise fashion as viewed from the left end of FIG. 4. Rotating in the clockwise direction, the input shaft 26' is coupled to and drives the spring drive drum 32' through the first overrunning clutch assembly 34'. At low torque levels, the wrap spring 90' wound about the spring drive drum 32' locks the ring gear 66' to the input shaft 26' and thus all of these elements rotate as one, transferring input speed and torque directly through the wrap spring downshift mechanism 20' to the output shaft 50'.

As torque increases and the reaction torque on the ring gear 66' exceeds the preload torque of the wrap spring 90' which is the result of the wrap spring 90' and spring drive drum 32' design parameters, most notably the interference fit between the inside diameter of the wrap spring 90' in its relaxed state and the outside diameter of the spring drive drum 32', the wrap spring 90' will expand, slip on the spring drive drum 32' and attempt to backdrive the spring lock ring 150. The sprag clutch assembly 168, however, prevents the spring lock ring 150 from rotating and the wrap spring 90' will thus further expand, contact the inner face of the spring sleeve 138 and the reaction sleeve 160 and thereby lock the spring sleeve 138 and the ring gear hub 70' to the reaction sleeve 160 on the housing 12'. Since the ring gear 66' and the ring gear hub 70' are now stationary by virtue of their connection through the wrap spring 90' to the reaction sleeve 160 and the housing 12', the planetary gear assembly 44' operates as a conventional planetary gear assembly to reduce the speed of the output shaft 50' relative to the input shaft 26' and increase torque correspondingly.

When the operating cycle is completed, the torque throughput of the automatic downshift mechanism 20' reduces and the wrap spring 90' collapses back upon the spring drive drum 32'. Once again, without the overrunning clutch assembly 34', a certain residual torque will be stored within the elements of the wrap spring downshift mechanism 20', primarily within the planetary gear assembly 44', resulting from the torque throughput and structural deflection occurring during the operating cycle. The overrunning clutch assembly 34' permits back driving of the components of the wrap spring downshift mechanism 20', that is, counterclockwise rotation of the input shaft 26' relative to the spring drive drum 32', thereby relieving such residual reaction torque.

Figure 5:
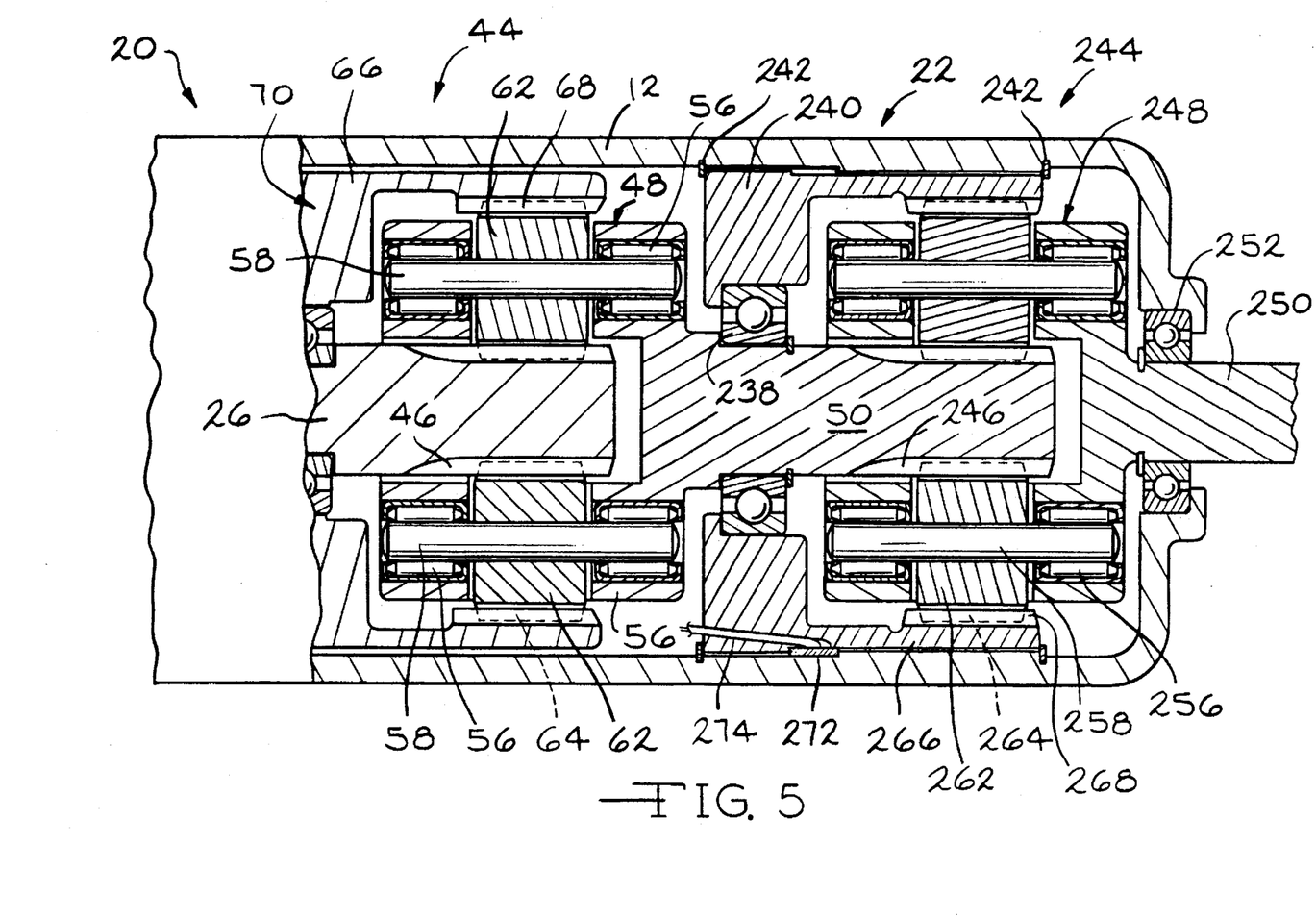
FIG. 5 is a full, sectional view of an alternate embodiment of the output gearing of an automatic downshift mechanism according to the present invention.

Referring now to FIG. 5, additional disclosure regarding the assembly tool 10 illustrated in FIG. 1 is shown. The additional disclosure relates to the output gearing 22 which preferably consists of a second planetary gear assembly 244 and a sensor for determining the torque applied by the assembly tool 10. The planetary gear assembly 44 which, for purposes of clarity will here be referred to as the first planetary gear assembly 44 includes gear teeth 46 which defines a sun gear disposed on the end of the input shaft 26 as noted above. The input shaft 26 is rotatably positioned and supported upon an anti-friction bearing such as the ball bearing assembly 38 which is supported by the ring assembly 70. The ring assembly 70 includes a ring gear 66 defining ring gear teeth 68. A carrier assembly 48 supports a plurality of roller bearing assemblies 56 which, in turn, support a plurality of stub shafts 58 which, in turn, rotatably support a plurality of pinion gears 62 having gear teeth 64.

The output shaft 50 is received by and rotatably supported within a ball bearing assembly 238. The ball bearing assembly 238 is fixedly supported within a stationary hub assembly 240 received within the housing 12. Suitable cooperating snap rings and grooves 242 retain the stationary hub assembly 240 within the housing 12 as will be readily appreciated.

The second planetary gear assembly 244 includes gear teeth 246 on the output shaft 50 of the first planetary gear assembly 44 which define a sun gear. A second carrier assembly 248 includes a plurality of roller bearing assemblies 256 which support a plurality of stub shafts 258 which rotatably support a like plurality of pinion gears 262 having gear teeth 264 about their peripheries. The gear teeth 264 mate with complimentarily configured gear teeth 266 in a ring gear 268 formed in the stationary hub assembly 240. The second carrier assembly 248 is coupled to or integrally formed with an output shaft 250 which is rotatably supported by a ball bearing assembly 252 secured within the end of the housing 12. In this configuration, the output speed reduction and thus torque increase is preferably in the range of from 12:1 to 40:1.

Depending upon the relative sizes of the sun gears 46 or 46', the planet gears 56 and 56' and the ring gears 66 and 66', the speed reduction ratio of the planetary gear assemblies 44 or 44' may each be in the range of from 3.5 to 1 or less to 10 to 1 or more, if an application demands it. In an assembly tool, torque delivery capability and shift points in the range of 16 to 285 Newton-meters has been readily achieved.

Referring now to FIGS. 1 and 5, in certain applications of the assembly tool 10, it has been found beneficial, and occasionally in fact necessary, to monitor the torque output of the assembly tool 10 during operation to provide an indication, for example, on either a long term average or individual fastener basis, of the torque applied. Data to provide such an indication may be derived from a sensor 272 preferably disposed between the stationary hub assembly 240 and the housing 12 of the final stage of fixed speed reduction gearing 22. The sensor 272 which is preferably a strain gauge or comparable device acts as the path of reaction torque between the stationary hub assembly 240 and the housing 12. For various reasons such as manufacturing and assembly ease, improved sensitivity and accuracy or other reasons additional sensors 272 may be disposed in uniform circumferential intervals about the exterior of the stationary hub assembly 240, between it and the inner surface of the housing 12 as will be readily appreciated. Electrical conductors 274 carry the data signal from the sensor 272 indicating the torque applied by the assembly tool 10 to external associated sensing, conditioning and recording equipment (not illustrated).

While the foregoing embodiments 20 and 20' of an wrap spring downshift mechanism have been described within the context and application parameters of an assembly tool, it should be appreciated that the down shift mechanism will have broad application in devices and power trains requiring torque and speed matching to a load and automatic shifting between a first, high speed, low torque output and a second, lower speed, higher torque output.

The foregoing disclosure is the best mode devised by the inventor for practicing this invention. It is apparent, however, that devices incorporating modifications and variations will be obvious to one skilled in the art of power transmission devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A wrap spring shift mechanism comprising, in combination, a housing, an input member, a planetary gear assembly having a ring gear disposed in a ring gear hub, a carrier having an output member, at least one planet gear disposed in said carrier in engagement with said ring gear, and a sun gear in engagement with said planet gear and driven by said input member, a wrap spring assembly having a drive drum, a first overrunning clutch disposed between said input member and said drive drum and a wrap spring disposed about said drive drum, means on said ring gear hub for engaging one end of said wrap spring, collar means for engaging the other end of said spring, a second overrunning clutch operably disposed between said collar means and said housing.

2. The wrap spring shift mechanism of claim 1 wherein said drive drum defines at least two external cylindrical surfaces having distinct diameters.

3. The wrap spring shift mechanism of claim 1 wherein said wrap spring includes a pair of ends and further including means for adjusting the position of one of said ends of said wrap spring relative to the other of said ends of said wrap spring.

4. The wrap spring shift mechanism of claim 1 further including a final stage of speed reducing gearing driven by said carrier and disposed in said housing, and a torque sensing device operably disposed between said speed reducing gearing and said housing.

5. A wrap spring shift mechanism comprising, in combination, an input member, a planetary gear assembly having a ring gear hub, a carrier having an output member, a sun gear and at least one planet gear rotatably disposed in said carrier in engagement with said ring gear hub and said sun gear, a wrap spring assembly having a drive drum, an overrunning clutch operably disposed between said drive drum and said input member, a wrap spring disposed in frictional contact about said drive drum, a driven drum disposed about said wrap spring and operably coupled to said ring gear hub and said wrap spring.

6. The wrap spring shift mechanism of claim 5 wherein said drive drum defines at least two external cylindrical surfaces having distinct diameters.

7. The wrap spring shift mechanism of claim 5 wherein said drive drum defines regions of two distinct outside diameters, the diameter of one of said regions being larger than the inside diameter of said wrap spring in a relaxed state and the other of said regions being smaller than the inside diameter of said wrap spring in said relaxed state.

8. The wrap spring shift mechanism of claim 5 wherein said wrap spring includes a pair of ends and further including means for adjusting the position of one of said ends of said wrap spring relative to the other of said ends of said wrap spring.

9. The wrap spring shift mechanism of claim 5 wherein said driven drum includes a plurality of axially extending pin receiving openings and further including a pin, a collar having a plurality of pin engaging spaces disposed thereabout and means for engaging said wrap spring.

10. The wrap spring shift mechanism of claim 5 further including a housing, a final stage of speed reducing gearing driven by said carrier and disposed in said housing, and a torque sensor device operably disposed between said speed reducing gearing and said housing.

11. The wrap spring shift mechanism of claim 5 wherein said sun gear is disposed on said input member.

12. The wrap spring shift mechanism of claim 5 further including a housing and a one-way clutch disposed between said driven drum and said housing.

13. The wrap spring shift mechanism of claim 5 wherein said wrap spring is of right-hand sense and includes at least ten turns.

14. The wrap spring shift mechanism of claim 5 further including cooperating means for providing limited relative rotation between said ring gear housing and said driven drum.

15. A wrap spring shift mechanism comprising, in combination, a housing having an inside surface, an input member, a wrap spring assembly having a drive drum, an overrunning clutch operably disposed between said input member and said drive drum, and a wrap spring disposed about said drive drum, said wrap spring having a pair of ends, a planetary gear assembly having a ring gear hub, a carrier providing an output, a sun gear driven by said input member, at least one planet gear rotatably disposed in said carrier and in engagement with said ring gear hub and said sun gear, said ring gear hub having means for engaging one of said pair of ends of said wrap spring and an inner surface radially adjacent said one of said pair of ends of said wrap spring, and a spring lock drum rotatably supported in said housing, said spring lock drum having means for engaging the other of said pair of ends of said wrap spring and another overrunning clutch operably disposed between said spring lock drum and said housing.

16. The wrap spring shift mechanism of claim 15 wherein said inside surface of said housing and said inner surface of said ring gear hub are substantially equal in diameter.

17. The wrap spring shift mechanism of claim 15 further including a additional stage of speed reduction gearing driven by said carrier, said additional stage of speed reduction gearing disposed in said housing, and including a second carrier and a torque sensing device operably disposed between said carrier and said housing.

18. The wrap spring shift mechanism of claim 15 wherein said drive drum has a uniform external diameter along a portion of its axial length engaged by said wrap spring.

19. The wrap spring shift mechanism of claim 15 further including bearing means disposed between said ring gear hub and said housing.

20. An assembly tool having wrap spring shift mechanism comprising, in combination, a housing, a drive motor, a wrap spring assembly having an input shaft, a drive drum, an overrunning clutch operably disposed between said input shaft and said drive drum, a wrap spring disposed about said drive drum, a driven drum disposed about said wrap spring and operably coupled to said wrap spring, a planetary gear speed reduction assembly having a ring gear hub operably connected to said driven drum, a carrier providing an output, a sun gear operably coupled to said input shaft and at least one planet gear rotatably disposed in said carrier and disposed in engagement with said ring gear hub and said sun gear, and another overrunning clutch operably disposed between said driven drum and said housing.

21. The assembly tool of claim 20 wherein said drive drum defines regions of two distinct outside diameters, the diameter of one of said regions being larger than the inside diameter of said wrap spring in a relaxed state and the other of said regions being smaller than the inside diameter of said wrap spring in said relaxed state.

22. The assembly tool of claim 20 wherein said wrap spring includes a pair of ends and further including means for adjusting the relative position of one of said ends of said wrap spring relative to the other of said ends of said wrap spring.

23. The assembly tool of claim 20 further including a final stage of speed reduction gearing, driven by said carrier and disposed in said housing, and a torque sensor device operably disposed between said speed reducing gearing and said housing.

* * * * *